(12) United States Patent
Rockstroh et al.

(10) Patent No.: US 6,339,208 B1
(45) Date of Patent: Jan. 15, 2002

(54) METHOD OF FORMING COOLING HOLES

(75) Inventors: Todd J. Rockstroh, Maineville; Wilbur D. Scheidt, Cincinnati, both of OH (US); Clarence A. Ash, Madisonville, KY (US)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 09/487,856

(22) Filed: Jan. 19, 2000

(51) Int. Cl.⁷ ............................................. B23K 26/00
(52) U.S. Cl. ............................. 219/121.71; 219/121.6; 219/121.61
(58) Field of Search ........................ 219/121.71, 121.6, 219/121.61

(56) References Cited

U.S. PATENT DOCUMENTS

| | | | | |
|---|---|---|---|---|
| 3,601,576 A | * | 8/1971 | Schlafli et al. ............ | 219/121 L |
| 3,806,829 A | * | 4/1974 | Duston et al. ............. | 331/94.5 |
| 4,220,842 A | * | 9/1980 | Stumer et al. ........ | 219/121 LM |
| 4,873,414 A | * | 10/1989 | Ma et al. ................ | 219/121.71 |
| 4,941,093 A | * | 7/1990 | Marshall et al. ........ | 364/413.01 |
| 4,960,970 A | * | 10/1990 | Schneiter ................. | 219/121.6 |
| 5,049,722 A | * | 9/1991 | Corfe et al. ............ | 219/121.71 |
| 5,083,006 A | * | 1/1992 | Stroud ................... | 219/121.71 |
| 5,140,127 A | * | 8/1992 | Stroud et al. .......... | 219/121.71 |
| 5,222,617 A | * | 6/1993 | Gregory et al. ........ | 219/121.71 |
| 5,614,114 A | * | 3/1997 | Owen .................... | 219/121.66 |
| 5,683,600 A | * | 11/1997 | Kelley et al. .......... | 219/121.71 |
| 5,747,769 A | * | 5/1998 | Rockstroh et al. ..... | 219/121.71 |
| 5,773,790 A | * | 6/1998 | Moore et al. .......... | 219/121.71 |
| 5,837,964 A | * | 11/1998 | Emer et al. ............ | 219/121.71 |
| 5,914,060 A | * | 5/1999 | Flis et al. .............. | 219/121.71 |
| 6,054,673 A | * | 4/2000 | Chen .................... | 219/121.71 |

FOREIGN PATENT DOCUMENTS

DE 004125801 A1 * 2/1993

OTHER PUBLICATIONS

Patent Application Ser. No. 08/932,715 entitled "Method and Apparatus for Laser Drilling", filed Sep. 17, 1997.

* cited by examiner

*Primary Examiner*—Tom Dunn
*Assistant Examiner*—Zidia Pittman
(74) *Attorney, Agent, or Firm*—Andrew C. Hess; V. Ramaswamy

(57) ABSTRACT

A method of forming cooling holes in a gas turbine engine component. The method includes the steps of forming a hole in the component extending between a first surface of the component and a second surface of the component opposite the first surface and supplying pressurized air to the hole from the second surface of the component. The method also includes the step of sensing a parameter representative of air flow through the hole. Further, the method includes enlarging the hole until the sensed parameter represents a preselected air flow rate through the hole.

11 Claims, 1 Drawing Sheet

METHOD OF FORMING COOLING HOLES

BACKGROUND OF THE INVENTION

The present invention relates generally to cooling holes in gas turbine engine components, and more particularly to a method of forming such holes.

Cooling holes are formed in gas turbine components such as vanes, blades and shrouds for transporting film cooling air through the component to cool the component and to form a fluid barrier between the component and hot gases traveling through a main flowpath of the engine. Frequently, these cooling holes are formed by aiming a laser at a selected point on the component for a predetermined period of time to burn a hole through the component. The laser is then aimed at another selected point on the component for a predetermined period of time to burn another hole in the component. This process is repeated to form all the cooling holes in the component. The period of time during which the laser is aimed at particular points is determined by evaluating holes made previously in other components.

Conventional lasers produce holes having large variations in flow rate. Thus, relying on historical data to determine the period of time to burn each hole results in large variations in cooling flow rates which ultimately reduce the effectiveness of the cooling. To compensate for worst case cooling flows, more air must be directed through the cooling holes. Directing more cooling air through the holes reduces the overall engine efficiency. Thus, the variability in cooling hole flow rates adversely affects overall engine performance.

Further, when conventional lasers are used to form holes in some components having internal cavities (e.g., turbine vanes and blades), fillers such as wax, plastics or ceramics must be injected in the cavities to prevent the laser from burning a hole through the wall at the opposite side of the cavity. These fillers must be removed from the cavities after the holes are formed. As a result, using fillers increases the time and expense required to form the holes.

SUMMARY OF THE INVENTION

Among the several features of the present invention may be noted the provision of a method of forming cooling holes in a gas turbine engine component. The method includes the steps of forming a hole in the component extending between a first surface of the component and a second surface of the component opposite the first surface and supplying pressurized air to the hole from the second surface of the component. The method also includes the step of sensing a parameter representative of air flow through the hole. Further, the method includes enlarging the hole until the sensed parameter represents a preselected air flow rate through the hole.

In another aspect, a method of the present invention includes the step of aiming a laser beam at a first surface of the component to form a hole in the component extending between the first surface of the component and a second surface opposite the first surface. In addition, the method includes the steps of supplying pressurized air to the hole from the second surface of the component and sensing a pressure of the air entering the hole. The method also includes the step of stopping the laser beam after the sensed pressure meets a predetermined value representing a preselected air flow rate through the hole.

In yet another aspect of the present invention, the method includes the step of directing a pulsing laser at the component. The method also includes the steps of adjusting the laser to have a pulse frequency of between about 100 hertz and about 100 megahertz, adjusting the laser to have a pulse energy of between about 0.001 joules and about 5 joules, and adjusting the laser to have a pulse duration of between about 10 picoseconds and about 100 microseconds.

Other features of the present invention will be in part apparent and in part pointed out hereinafter.

DETAILED DESCRIPTION OF THE PREFERRED EMBODIMENT

Figure 1:
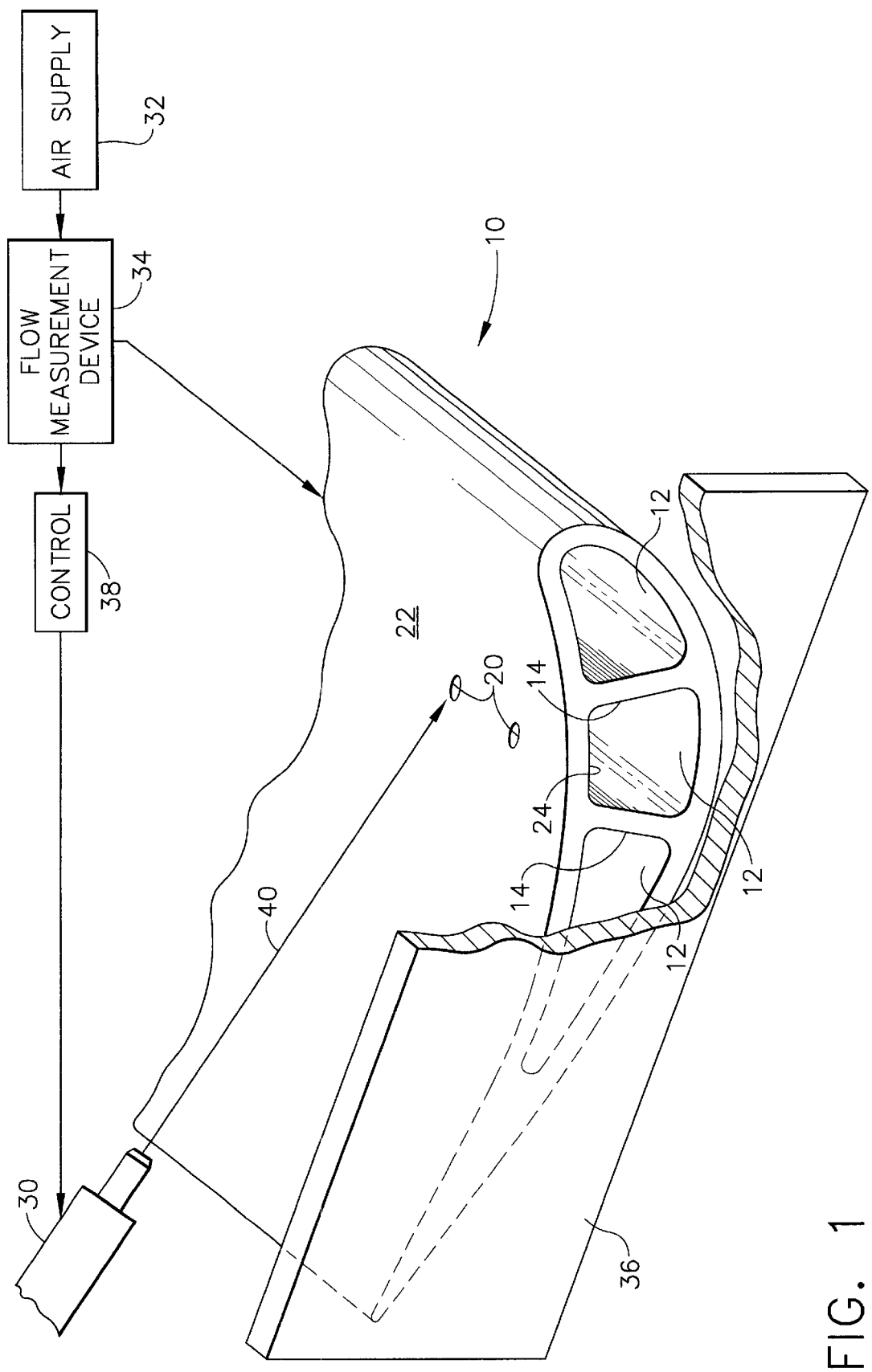
FIG. 1 is a schematic of a laser forming a hole in a turbine vane using the method of the present invention.

Referring now to the drawings and in particular to FIG. 1, a gas turbine engine component is generally designated in its entirety by the reference numeral 10. Although the method of the present invention may be used to form holes in other components such as turbine blades and shrouds, the component shown in FIG. 1 is a turbine vane 10 having internal passages or cavities 12 separated by walls 14. Holes 20 are formed in the vane 10. The holes 20 extend between a first surface 22 and a second surface 24 opposite the first surface defining, in part, the internal passages 12. Although only two holes are shown in FIG. 1, those skilled in the art will appreciate that more holes 20 are preferably formed in the component 10. The number, sizes, positioning and orientations of these holes 20 are determined based upon the desired cooling airflow characteristics of the component 10. As the features of the gas turbine engine component 10 described above are conventional and well known, they will not be described in further detail.

The cooling holes 20 of the present invention are formed in the component 10 using a laser 30. Rather than using a conventional laser having a pulse duration of 0.1 to 4.0 milliseconds, a pulse frequency of 1 to 100 hertz and a pulse energy of 5 to 100 joules, the laser 30 used in the method of the preferred embodiment is adjusted to have a pulse duration of about 10 picoseconds to about 100 microseconds, a pulse frequency of about 100 hertz to about 100 megahertz and a pulse energy of about 1 millijoules to about 5 joules. As can be seen by comparing these parameters, the laser 30 used in the method of the present invention has a shorter pulse duration, a higher frequency and a lower energy than conventional lasers used to form holes in gas turbine engine components. Although other lasers may be used without departing from the scope of the present invention, the laser 30 of the preferred embodiment is a Coherent General M34 Nd: YAG pulsing laser available from Convergent Energy of Sturbridge, Mass. As will be appreciated by those skilled in the art, the preferred laser 30 is "q-switched" to have the parameters described above. Further, although the laser 30 may be mounted on other equipment without departing from the scope of the present invention, in the preferred embodiment the laser is mounted on a Huffman HP75 5-axis CNC machine tool available from Huffman Corp. of Clover, S.C.

To form the holes 20, the component 10 is loaded in a conventional fixture (not shown) and one end of the component is attached to a pressurized air supply 32. A calibrated airflow measurement device 34 (such as available from Flow Systems, Inc. of Berthoud, Colo.) is mounted between the component 10 and the air supply 32 for measuring a parameter representative of airflow through the holes 20. For instance, the device may measure pressure in the internal passage 12 or it may measure air flow through the passage. The end of the pressurized internal passage 12 opposite the air supply 32 is blocked by a sealing plate 36 to prevent air from escaping from that end of the passage. Once the component 10 is in position on the fixture and the air supply 32 and plate 36 are in place, the air supply is activated to deliver air to the internal passage 12 of the component until some predetermined pressure (e.g., 16 psi to 30 psi or more) is achieved inside the passage.

A control 38 (such as a FANUC CNC controller frequently sold with the previously mentioned machine tool) translates and rotates the laser 30 and/or the component 10 into the correct location for forming the first hole 20. The control 38 opens a shutter (not shown) inside the laser 30 so a laser pulse train or beam 40 is emitted from the laser. The beam 40 is aimed at the component 10 to form the hole 20. After the hole 20 is formed, the flow measurement device 34 senses a change in the measured parameter (e.g., a drop in pressure inside the internal passage 12 or an increase in flow rate through the passage) which corresponds to the air leaking through the hole. This parameter is input to the control 40 which repositions the laser and/or the component 10 to enlarge the hole 20. The parameter is continuously monitored and compared to a preselected value which represents a preselected air flow rate. When the parameter reaches the preselected value, the control 38 signals the laser 30 to close the shutter.

After the first hole 20 is formed, the control 38 translates and rotates the laser 30 and/or the component 10 into the correct location for forming the second hole 20 and the process is repeated. As will be appreciated by those skilled in the art, the laser 30 may be stopped during the formation of the second and subsequent holes after the measured parameter reaches a preselected value or after a period of time related to (e.g., equal to) the amount of time taken to form the first hole. Further, when the process is repeated to form subsequent holes, the actual air flow through the previously formed holes may be used to determine the preselected parameter for drilling the next few holes. For instance, if the actual flow through the first two holes is slightly below nominal, the preselected value of the parameter used for forming the next three holes may be adjusted slightly upward so the total flow through all five holes is nominal.

Using conventional lasers, one to one hundred pulses are required to drill a cooling hole. Using the laser and method of the present invention, one hundred to several million pulses are required to drill a hole. However, the total drill time is not increased significantly because the pulse frequency is increased. Further, the method of the present invention permits the laser pulses to be stopped precisely (e.g., plus or minus one pulse). Although the conventional laser drilling methods produce variations in component flow rates of as much as about ten percent from nominal and sometimes as much as thirty percent from nominal, it is anticipated that the method described above will produce flow rates which vary no more than about five percent from nominal and possibly as little as one percent from nominal because smaller amounts of material are taken during each laser pulse.

In addition, because smaller amounts of material are removed during each pulse, it is envisioned that the method described above may be used to form non-circular (e.g., trapezoidal) holes to vary the thickness and position of cooling air flowing over the component 10 to optimize film cooling. Further, because each pulse removes an extremely small amount of material, each pulse is incapable of appreciably damaging the component 10. Thus, errant pulses directed toward internal walls 14 or other interior features of the component 10 will not damage the component. As a result, no fillers are needed to protect the wall 14 or other interior features against damage from errant pulses when using the method of the present invention, and consequently the method eliminates the need for steps required to clear the passages.

Because the pulses are at extremely high peak power (e.g., about 100 kilowatts to over 1 megawatt, compared to 10 to 70 kilowatts with conventional lasers), there is a higher efficiency in vaporization of material being removed from the hole and less melting. Consequently, the method of the present invention produces a cleaner more repeatable hole, reducing the need for cleaning pulses once the hole is formed.

Another advantage of the method of the present invention is that pressurizing the internal cavity of the component improves hole quality. A typical laser hole has a burr and dross at the edge of the hole opposite the laser (i.e., at the internal cavity). The burr is re-solidified material inside the hole which can affect air flow through the hole. Because the cavity is pressurized during the method of the present invention, the escaping air prevents a burr from forming internally by pushing the molten material back through the hole. This eliminates the burr and provides a smoother surface inside the hole.

In addition, because the method of the present invention produces holes having flow rates which are closer to nominal, the worst case flow condition (i.e., minimum flow) is closer to nominal. Frequently, nominal cooling flow rates of components are chosen to ensure sufficient flow during worst case conditions. If this condition is closer to the nominal flow rate, the nominal flow rate may be reduced. When less cooling air is required to account for worst case flow conditions, the engine uses less fuel. Alternatively, the aggregate hole area can be increased and the same amount of air may be used allowing the engine to run cooler. This enables extended component life or permits increased maximum engine temperatures and available thrust.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of forming cooling holes in a component comprising the steps of:
   forming a hole in the component extending between a first surface of the component and a second surface of the component opposite the first surface;
   supplying pressurized air to the hole from the second surface of the component;
   sensing a parameter representative of air flow through the hole; and
   enlarging the hole until the sensed parameter represents a preselected air flow rate through the hole.

2. A method as set forth in claim 1 wherein the steps of forming the hole and enlarging the hole are accomplished using a laser.

3. A method as set forth in claim 1 wherein the step of sensing the parameter includes the step of sensing the pressure at the second surface of the component.

4. A method of forming cooling holes in a component comprising the steps of:
   aiming a laser beam from a laser at a first surface of the component to form a hole in the component extending between the first surface of the component and a second surface opposite the first surface;
   supplying pressurized air to the hole from the second surface of the component;
   sensing a pressure of the air entering the hole; and
   stopping the laser beam after the sensed pressure meets a predetermined value representing a preselected air flow rate through the hole.

5. A method as set forth in claim 4 wherein said hole is a first hole and the method further comprises the steps of:
   aiming the laser beam at said first surface of the component to form a second hole in the component extending between the first surface of the component and the second surface; and
   stopping the laser beam after a period of time related to an amount of time during which said laser beam was aimed at said first surface of the component to form said first hole.

6. A method as set forth in claim 5 wherein the period of time after which the laser beam is stopped is equal to the amount of time during which said laser beam was aimed at said first surface of the component to form said first hole.

7. A method as set forth in claim 4 wherein the laser is a pulsing laser adjusted to have a pulse frequency of between about 100 hertz and about 100 megahertz, a pulse energy of between about 0.001 joules and about 5 joules and a pulse duration of between about 10 picoseconds and about 100 microseconds.

8. A method of forming a hole in a component comprising the step of:
   forming a hole in the component with a laser; wherein the step of forming the hole comprises sensing a parameter representative of a fluid flow.

9. The method of claim 8 wherein the step of forming the hole comprises pulsing the laser at a pulse frequency of between about 100 hertz and about 100 megahertz.

10. The method of claim 8 wherein the step of forming the hole comprises pulsing the laser to have a pulse energy of between about 0.001 joules and about 5 joules.

11. The method of claim 8 wherein the step of forming the hole comprises pulsing the laser to have a pulse duration of between about 10 picoseconds and about 100 microseconds.

* * * * *